United States Patent [19]

Patel

[11] 4,188,456

[45] Feb. 12, 1980

[54] PRESSURE-SENSITIVE RECORDING SHEET

[75] Inventor: Rashmikant R. Patel, Appleton, Wis.

[73] Assignee: NCR Corporation, Dayton, Ohio

[21] Appl. No.: 863,949

[22] Filed: Dec. 23, 1977

[51] Int. Cl.[2] ........................ B32B 27/10; B32B 27/42; B41M 5/16

[52] U.S. Cl. .................................... 428/530; 282/27.5; 427/146; 427/150; 427/261; 428/307; 428/537; 428/914

[58] Field of Search ............... 428/537, 914, 307, 452, 428/411, 530; 282/27.5; 427/146, 150, 151, 261

[56] References Cited

U.S. PATENT DOCUMENTS

| | | | |
|---|---|---|---|
| 1,697,885 | 1/1923 | Seebach | 260/59 R |
| 2,712,507 | 7/1955 | Green | 428/307 |
| 3,491,111 | 1/1970 | Lin | 282/27.5 |
| 3,516,845 | 6/1970 | Brockett | 428/452 X |
| 3,672,935 | 6/1972 | Miller et al. | 282/27.5 |
| 3,723,156 | 3/1973 | Brockett et al. | 282/27.5 |
| 3,732,120 | 5/1973 | Brockett et al. | 428/307 |
| 3,856,553 | 12/1974 | Hayashi et al. | 282/27.5 |
| 3,952,132 | 4/1976 | Kato et al. | 427/151 X |

FOREIGN PATENT DOCUMENTS

| | | |
|---|---|---|
| 1329065 | 9/1973 | United Kingdom . |
| 1426641 | 3/1976 | United Kingdom . |
| 1467003 | 3/1977 | United Kingdom . |
| 1490288 | 10/1977 | United Kingdom . |
| 1490464 | 11/1977 | United Kingdom . |
| 1495126 | 12/1977 | United Kingdom . |

*Primary Examiner*—Thomas J. Herbert, Jr.
*Attorney, Agent, or Firm*—Birch, Stewart, Kolasch & Birch

[57] ABSTRACT

A pressure-sensitive record sheet material comprising a supporting web material having adhesively bound on the surface thereof a coating composition comprising kaolin clay, a zinc-modified alkyphenol-formaldehyde resin and a metallic compound selected from the group consisting of calcium oxide, calcium hydroxide and magnesium oxide, said resin and metallic compound combining to produce an improved color response when contacted with a color-producing material.

12 Claims, No Drawings

PRESSURE-SENSITIVE RECORDING SHEET

BACKGROUND AND SUMMARY OF THE INVENTION

The present invention relates to a substantially improved color-developer composition for use in recording sheets. More particularly, the present invention is directed to a pressure-sensitive record sheet material which comprises a supporting web containing a coating composition adhered thereto, said coating composition exhibiting enhanced color and enhanced fade resistance when reacted with normally colorless chromogenic compounds.

A record member, as the term is used in describing this invention, comprises a base sheet or web member either of fibrous construction, such as paper, or of continuous structure, such as films of organic polymeric material, carrying the color-reactant particles in an exposed state with respect to applied ink. Particles of the coating composition of this invention are arranged in intimate juxtaposition to form an apparently unbroken ink-receptive surface, yet substantially each particle individually is available for contact with applied ink. While the record member is adapted to receive any kind of ink, whether colored or colorable, its special utility is its use with an oily ink which is normally colorless or only slightly colored and carries in liquid solution a colorless chromogenic reactant having the property of becoming colored upon contact with an acidic composition.

During the last decade, one of the most prominent of such colorless recording systems utilized a coloring principle in which an oily ink having included therein chromogenic reactants, normally colorless, was used on an ink-receiving sheet sensitized with substantially oil-soluble acid reactants, such as phenolic resins, or insoluble acid-like materials of high surface activity, such as attapulgite and zeolite material. As the normally colorless chromogenic material content of inks used therewith, the most outstanding is Crystal Violet Lactone which in the colored form has intense hue in the blue end of the visual spectrum band. Such systems are disclosed in U.S. Pat. No. 2,712,507, which issued July 5, 1955, on the application of Barrett K. Green, and in U.S. Pat. No. 3,672,935, which issued June 27, 1972, on the application of Robert E. Miller, et al, and pertain to constructions in which the ink is applied from an oversheet by pressure release from microscopic capsules. These systems are now in world-wide use and command a predominant position in the field of colorless recording systems, and their continued use is expected.

As distinguished from pigment inks, the chromogenic material in the colorless ink of these systems is in the nature of a colorless dye or combination of dyes that assume, through chemical reaction, a visually distinctive color when undergoing reaction with the acid reactant on the sheet.

For most recording purposes, it is essential from a commercial standpoint that a distinctively colored mark make prompt appearance on the application of colorless ink to the recording surface to produce a visible representation of whatever is meant to be recorded, that the color be of distinctive hue but also of high intensity, and that the mark remain colored for a long period of time consistent with the objective of permanent recording. The well-known infirmities of colored dyes as regards permanence relate to light fading, thermal fading, and molecular rearrangements and disintegrations of various kinds in which part or all of the visually perceptible color is lost.

Accordingly, it is an object of the present invention to provide a color-developer composition which is used in the preparation of recording sheets, said color-developer composition exhibiting enhanced color and enhanced fade resistance.

Another object of the present invention is to provide a color-developer composition for use in carbonless copy paper record materials which produce developed prints that are more resistant to fade than any of those developed by the known prior art systems.

A further object of the present invention is to provide a developer composition for use in carbonless copy paper record materials which give developed prints that are more intense when freshly developed compared to those developed by known resinous systems.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that an improved coating composition which exhibits enhanced color and enhanced fade resistance when reacted with normally colorless chromogenic compounds can be produced by utilizing specific phenol-formaldehyde resins with a specific metal in its oxide or hydroxide form in the color developer composition. Thus, the present invention achieves a substantial improvement in color response of specific resins by the addition of a specific metal thereto.

The particular phenol-formaldehyde resins which are effective in achieving the improved color response as defined by the present invention are zinc-modified alkylphenol-formaldehyde resins wherein the alkyl group contains 8 or 9 carbon atoms. These alkylphenol-formaldehyde resins include zinc-modified para-octylphenol-formaldehyde resin and zinc-modified para-nonylphenol formaldehyde resin. The preferred zinc-modified alkylphenol-formaldehyde resin of the present invention is para-octylphenol-formaldehyde resin, hereinafter referred to as the Zn-POP resin. The zinc-modified alkylphenol-formaldehyde resins utilized in the present invention can be made much in the manner of the zinc-modified phenolformaldehyde novolak resins as described in U.S. Pat. No. 3,737,410.

The specific metal compound which is utilized in the developer composition of the present invention is either calcium oxide, calcium hydroxide or magnesium oxide. Thus, it is the specific use of both the zinc-modified alkylphenol-formaldehyde resin and either calcium oxide, calcium hydroxide or magnesium oxide in the developer composition which is effective in producing a developer composition used in carbonless copy paper record materials which produce developed prints which are more intense and resistant to fade when compared to prior art resinous systems. Thus, metal oxides and hydroxides other than calcium oxide, calcium hydroxide and magnesium oxide, when utilized together with the above-mentioned resins, do not produce the advantageous results as defined by the present invention. Even metals which are in the same group of the Periodic Table as calcium and magnesium, for example barium, when used in either oxide or hydroxide form together with the above zinc-modified alkylphenol-formaldehyde resins, do not achieve the improvements in print intensity and fade resistance as defined by the present invention. Calcium oxide and calcium hydroxide have been found to produce particularly desirable results.

In still a further advantageous feature of the present invention, it has been found that particularly desirable results are achieved when the calcium oxide, calcium hydroxide or magnesium oxide is present in an amount of about 0.5 to 6% by dry weight based upon the dry weight of the total developer composition, preferably about 1 to 4% by dry weight.

In addition of the zinc-modified alkylphenol-formaldehyde resins and either calcium oxide, calcium hydroxide or magnesium oxide, a typical developer composition would include such materials as kaolin clay, silica gel, calcium carbonate, and various binders, such as for example, styrene-butadiene latex binder and cooked starch binder.

Kaolin is generally known and used in the paper-making industry as "China Clay" and is outstandingly preferable as the particulate oil-insoluble and water-insoluble material for improving the printing quality of the paper. A white kaolin is used and, because of its whiteness, its plate-like particle form, which gives it unparalleled coating properties in aqueous slurries, its universal abundance in supply, its historical general usage in the paper-making and paper-converting industries and its low cost, it is an ideal material. Of course, there are many other materials of a mineral nature which can be used instead of and matched against kaolin clays as the standard of perfection. Other types of materials such as bentonites can be utilized, although they are not as good as kaolin from a rheological standpoint and from the standpoint of printing quality.

From the foregoing choice of materials, a number of different specific compositions on a dry basis can be made, and these may then be used as desired, as being made into an aqueous slurry to be coated on a finished paper sheet, to be applied to a wet sheet of paper in the formative state in any desired manner, or made a part of the paper finish from which a paper sheet is made, or on the other hand, applied as a dispersion coating to a continuous film-like web such as synthetic organic polymeric material made into record sheets, bands, or strips, or to any record support material surface, all coming within certain limits merely set as practical and not set for any chemical or physical reason. In general, so as to be economical, the materials should be used in just sufficient quantities to make useful records for the purpose in view, and this relates to criteria of the factors of intensity, definition, color, and a great many other factors with regard to the characteristics of the base web material, the characteristics of the ink to be applied, and the environment of use, all of which come within the paper manufacturers' and printers' skill and general knowledge and are not deemed to be of inventive or operative significance, but following and employing the inventive concept. Generally, but not as a limitation in any sense, an aqueous dispersion of the particulate materials could well be from 30% to 70% water, by weight, and the remainder from 70% down to 30% being solid reactants. Amounts of paper-coating adhesives are added as is necessary to adhere the particles to the base web to which it is applied, but, of course, adhesives that have a tendency to mask the particles physically should not be used, nor should any material be used as an adhesive in great excess of actual requirements, all of such factors tending to decrease the efficient use of the associated active particles because of a limitation of the exposed surface area. Here again, the paper makers' and printers' skill and judgment play a part.

If desired, some attapulgite or zeolite material may be used with the polymeric material and kaolin clay, and it is within contemplation that other materials of reactant nature can be employed to supplement the main reactant, for specific purposes. In this area of permissible substitutes or addition materials, silica gel has considerable standing because it is capable of instantaneously strongly coloring oil solutions of normally colorless chromogenic materials and is an efficient oil receptor for oil-base ink. Where the particles of kaolin and acid polymeric material are slightly delayed in responsiveness because of their physical situation or condition in the support sheet, an amount of silica gel up to equal the amount of acid polymeric material may be used for its beneficient effect in the characteristic states, but such use is not necessary to the practice of the invention in its simplest form. Silica gel is oil-insoluble but absorbent thereof, may be finely ground, is colorless, disperses readily in water, and may be treated to increase its porosity and effectiveness as an acid. The polymeric-material-produced color of normally colorless chromogenic material is significantly more persistent than that produced by silica gel, and this must be considered in the use of the latter material.

The particle size of the reactants preferably should be from 1 to 3 microns in largest dimension, although considerable latitude at the expense of efficiency and economy is tolerable. For instance, if the grinding of materials to the most effective size is too expensive, their larger sizes are tolerable as long as sufficient color reaction per unit area of the record material is provided. On the other hand, finer grinding may result in more efficient use of materials on a weight basis, if not on a cost basis, and a lighter weight finished sheet may thereby be produced.

One of the chief considerations in selecting a preferred embodiment of the present invention must be concerned with the manufacture of the record sheet, and as of now one of the best ways to sensitize a sheet is to apply an aqueous slurry of the novel composition to a finished web of paper as it passes the coating station in a paper-making machine. Such a coating composition contains binder material and may contain defoamers and dispersing agents common to paper-coating practices, but their specification in no way is to mean a limitation of the practice of the invention in regard to either choice or necessity.

The binders which can be utilized in the developer composition of the present invention include gum arabic, ethyl cellulose, nitrocellulose, styrene-butadiene latex, and the like. The resinous particles are commonly bound to paper with cooked starch binder and latex binders such as styrene-butadiene latexes.

The following examples are given to illustrate some of the features of the present invention and should not be considered as limiting.

EXAMPLE I

The effect of calcium oxide on CF coatings utilizing different resinous systems was tested as follows. The resins tested were Zn-PPP (zinc-modified para-phenylphenol-formaldehyde resin), Zn-PTB (zinc-modified para-tertiary butylphenol-formaldehyde resin), Zn-POP (zinc-modified para-octylphenol-formaldehyde resin), and PPP, PTB and POP which are unmodified or non-zinc-modified forms of these resins. The above-mentioned resins were ground separately in an attritor at 50% solids. The resin grind formula utilized is shown in the following Table I.

TABLE I

50% Resin Grind Formula (grinding time = 35 minutes)

| Materials | Dry (gms) | Wet (gms) |
|---|---|---|
| Resin | 150.0 | 150.0 |
| Water | — | 130.5 |
| Dispersant* | 4.5 | 18.0 |
| DiAmmonium Phosphate | 1.5 | 1.5 |
| TOTALS | 156.0 | 300.0 |

*Sodium salt of a carboxylate polyelectrolyte

These resin grinds were then used in a CF coating composition as shown in Tables II, III, and IV, the coating formula of Table II containing 6% CaO, the coating formula of Table III containing 1% CaO, and the coating formula of Table IV containing no CaO. The results of the formulations set forth in Tables II, III, and IV are tabulated in Table V where direct comparisons can be made on the effect calcium oxide has on various resinous systems. The coating pH was checked for each coating mix and the coated sheets were checked for typewriter intensity, fade resistance, and surface pH.

TABLE II

CF Coating Formula with Calcium Oxide (32% solids)

| Materials | Dry (gms) | Wet (gms) |
|---|---|---|
| Water | — | 30.0 |
| Calcium Oxide | 6.0 | 6.0 |
| *Resin Grind at 50% | 7.4 | 14.8 |
| Kaolin Clay Slurry at 68% | 68.1 | 100.2 |
| Calcium Carbonate | 6.0 | 6.0 |
| Water | — | 60.0 |
| Penford Gum 230 at 12% (hydroxy ethylated corn starch) | 6.5 | 54.2 |

TABLE II-continued

CF Coating Formula with Calcium Oxide (32% solids)

| Materials | Dry (gms) | Wet (gms) |
|---|---|---|
| Water | — | 28.8 |
| Latex Dow 620 at 50% (styrene-butadiene latex) | 6.0 | 12.0 |
| TOTALS | 100.0 | 312.0 |

*Resins used: Zn-PPP, Zn-PTB, Zn-POP I, Zn-POP II, PPP, PTB, and POP

TABLE III

CF Coating Formula with Calcium Oxide (32% solids)

| Materials | Dry (gms) | Wet (gms) |
|---|---|---|
| Water | — | 30.0 |
| Calcium Oxide | 1.0 | 1.0 |
| *Resin at 50% | 7.4 | 14.8 |
| Kaolin Clay Slurry at 68% | 73.1 | 107.5 |
| Calcium Carbonate | 6.0 | 6.0 |
| Water | — | 60.0 |
| P.G. 230 at 12% (starch) | 6.5 | 54.2 |
| Water | — | 26.5 |
| Latex Dow 620 at 50% | 6.0 | 12.0 |
| TOTALS | 100.0 | 312.0 |

*Resins used: Zn-PPP, Zn-PTB, Zn-POP I, made with zinc dibenzoate and Zn-POP II, made with zinc formate

TABLE IV

CF Coating Formula Without Calcium Oxide (32% solids)

| Materials | Dry (gms) | Wet (gms) |
|---|---|---|
| Water | — | 116.0 |
| *Resin Grind at 50% | 7.4 | 14.8 |
| Clay Slurry at 68% | 74.1 | 109.0 |
| Calcium Carbonate | 6.0 | 6.0 |
| P.G. 230 at 12% (starch) | 6.5 | 54.2 |
| Latex Dow 620 at 50% | 6.0 | 12.0 |
| TOTALS | 100.0 | 312.0 |

*Resins used: Zn-PPP, Zn-PTB, Zn-POP I, Zn-POP II, PPP, PTB, and POP

TABLE V

Test Results

| | | Typewriter Intensity (20 minutes) | Typewriter Intensity (48 hours) | Surface pH | Coating pH | Fade T.I. Δ (24 hours) |
|---|---|---|---|---|---|---|
| | Zn-PPP | 58 | 45 | 11.70 | 12.65 | 27 |
| Coating | Zn-PTB | 41 | 36 | 11.70 | 12.80 | 25 |
| Formula | Zn-POP I | 28 | 27 | 11.80 | 12.70 | 11 |
| of | Zn-POP II | 28 | 27 | 11.80 | 12.70 | 8 |
| Table II | PPP | 58 | 42 | 11.80 | 12.70 | 30 |
| using | PTB | 43 | 36 | 11.50 | 12.80 | 27 |
| 6% CaO | POP | 40 | 37 | 11.80 | 12.90 | 21 |
| Coating | Zn-PPP | 59 | 46 | 8.30 | 12.25 | 14 |
| Formula | Zn-PTB | 29 | 30 | 8.05 | 11.80 | 10 |
| of | Zn-POP I | 31 | 31 | 8.30 | 12.40 | 7 |
| Table III | Zn-POP II | 33 | 32 | 8.55 | 12.60 | 8 |
| using | PPP | 52 | 42 | 8.95 | 11.85 | 26 |
| 1% CaO | PTB | 46 | 43 | 8.95 | 11.95 | 26 |
| | POP | 61 | 54 | 9.00 | 12.20 | 25 |
| Coating | Zn-PPP | 37 | 37 | 8.30 | 8.35 | 11 |
| Formula | Zn-PTB | 36 | 36 | 7.50 | 8.25 | 11 |
| of | Zn-POP I | 38 | 38 | 8.00 | 8.15 | 13 |
| Table IV | Zn-POP II | 36 | 36 | 7.90 | 7.85 | 8 |
| using no | PPP | 38 | 37 | 7.40 | 7.70 | 24 |
| CaO | PTB | 48 | 44 | 7.60 | 7.60 | 27 |
| | POP | 56 | 49 | 7.70 | 7.60 | 23 |

In Table VI below, oxides and hydroxides of metals in Groups IA, IIA, IIIA, IIB, and IVB of the Periodic Table were used in CF coating to evaluate the effect of the various oxides and hydroxides on CF intensity. Thus, CF coatings were made using the coating formula in Table VI and checked for intensity (TI) and UV fade resistance with the results being reported in Table VII below. The CF control clay coating was made by replacing the oxide constituent with clay. A special CF coating was made by using a coating as formulated in the clay control and then adjusting the pH by NaOH (50% solution) to slowly bring the pH to 12.8.

TABLE VI

| CF Coating Formula (32% solids) | | |
|---|---|---|
| Materials | Dry (lb) | Wet (lb) |
| Water | — | 30.0 |
| *Oxide or Hydroxide | 6.0 | 6.0 |
| Resin Grind at 54% (Zn-POP I) | 7.4 | 13.7 |
| Clay Slurry at 68% | 68.1 | 100.2 |
| Calcium Carbonate | 6.0 | 6.0 |
| Water | — | 60.0 |
| Starch P.G. 230 at 12% | 6.5 | 54.2 |
| Water | — | 29.9 |
| Latex Dow 620 at 50% | 6.0 | 12.0 |
| TOTALS | 100.0 | 312.0 |

*Oxide or Hydroxide Used: Calcium oxide, Barium oxide, Barium hydroxide, Magnesium oxide, Magnesium hydroxide, Calcium hydroxide, Zinc oxide, Titanium dioxide, Potassium hydroxide, Sodium hydroxide, Aluminum oxide, and Clay (control).

TABLE VII

| Test Results | | | | Fade | |
|---|---|---|---|---|---|
| Oxide or Hydroxide Used | Typewriter (20 min.) | Intensity (48 hrs) | Coating pH | T.I.Δ (24 hrs) | Actual Intensity |
| Calcium Oxide | 23 | 23 | 12.8 | 8 | 31 |
| Barium Oxide | 32 | 31 | 13.1 | 12 | 43 |
| Barium Hydroxide | 31 | 29 | 12.9 | 7 | 36 |
| Magnesium Oxide | 28 | 27 | 11.8 | 9 | 36 |
| Magnesium Hydroxide | 35 | 33 | 9.7 | 8 | 41 |
| Calcium Hydroxide | 22 | 22 | 12.6 | 7 | 29 |
| Zinc Oxide | 32 | 31 | 10.0 | 7 | 38 |
| Titanium Dioxide | 35 | 35 | 8.7 | 8 | 43 |
| Potassium Hydroxide | 77 | 65 | 13.35 | 23 | 88 |
| Sodium Hydroxide | 71 | 64 | 13.2 | 17 | 81 |
| Aluminum Oxide | 36 | 35 | 9.2 | 9 | 44 |
| Clay (Control) | 37 | 37 | 8.4 | 8 | 45 |
| Sodium Hydroxide | 45 | 43 | 12.8 | 10 | 53 |

The results shown in the previous tables can be summarized as follows:

(1) The Zn-POP resins show much better intensity with CaO compared to the other resins (see Table V);

(2) The fade data from Table V show that the Zn-POP resins containing calcium oxide have the least fade;

(3) Zincated POP resins show a substantial improvement over unzincated POP resins;

(4) Different oxides and hydroxides behave differently with the Zn-POP resin (see Table VII); and (5) Although some of the oxides improved the intensity, calcium oxide and calcium hydroxide gave the best intensity values with magnesium oxide and barium hydroxide not being too far behind. Sodium hydroxide and potassium hydroxide actually hurt the intensity of the CF sheet very badly. Using sodium hydroxide (0.9 gm/7.4 gm resin dry) to bring the pH to be equivalent to that when calcium oxide was utilized also hurt the intensity. All oxides and hydroxides seem to increase the coating pH.

A further study of CF coating was made using varying amounts of calcium oxide ranging from 0–6% by dry weight and using 7% by dry weight of the resin in all of the coatings. The amount of clay was replaced for equivalent amounts of calcium oxide which was utilized. CF coatings were made and checked for coating pH, typewriter intensity, and fade resistance with the results being reported in Table VIII on the following page.

TABLE VIII

| | CF Coating Formulas. Dry Parts | | | | | | | | | |
|---|---|---|---|---|---|---|---|---|---|---|
| Materials | 1 | 2 | 3 | 4 | 5 | 6 | 7 | 8 | 9 | 10 |
| Calcium Oxide | 0.0 | 0.25 | 0.5 | 1.0 | 1.5 | 2.0 | 3.0 | 4.0 | 5.0 | 6.0 |
| Resin Grind at 54% (Zn POP I) | 7.4 | 7.4 | 7.4 | 7.4 | 7.4 | 7.4 | 7.4 | 7.4 | 7.4 | 7.4 |
| Clay Slurry at 68% | 74.1 | 73.85 | 73.6 | 73.1 | 72.6 | 72.1 | 71.1 | 70.1 | 69.1 | 68.1 |
| Calcium Carbonate | 6.0 | 6.0 | 6.0 | 6.0 | 6.0 | 6.0 | 6.0 | 6.0 | 6.0 | 6.0 |
| Starch P.G. 230 at 12% | 6.5 | 6.5 | 6.5 | 6.5 | 6.5 | 6.5 | 6.5 | 6.5 | 6.5 | 6.5 |
| Latex Dow 620 at 50% | 6.0 | 6.0 | 6.0 | 6.0 | 6.0 | 6.0 | 6.0 | 6.0 | 6.0 | 6.0 |
| TOTALS | 100.0 | 100.0 | 100.0 | 100.0 | 100.0 | 100.0 | 100.0 | 100.0 | 100.0 | 100.0 |
| Coating pH | 8.35 | 11.1 | 11.4 | 12.5 | 12.6 | 12.7 | 12.8 | 12.75 | 12.8 | 12.8 |
| Typewriter Intensity: | | | | | | | | | | |
| 20 minutes | 36 | 36 | 35 | 30 | 27 | 27 | 25 | 24 | 24 | 24 |
| 48 hours | 36 | 35 | 34 | 29 | 27 | 27 | 24 | 24 | 24 | 24 |
| Fade | | | | | | | | | | |
| T.I Δ 24 hours | 7 | 5 | 7 | 7 | 5 | 5 | 8 | 7 | 8 | 6 |
| Δ 48 hours | 22 | 16 | 23 | 19 | 14 | 16 | 17 | 20 | 23 | 17 |

There is no improvement of intensity until the amount of calcium oxide or calcium hydroxide reaches about 10% (1 part) based on the amount of the resin (see Table VIII). The pH of the coating jumped to 11.1 even when using the lowest amount of calcium oxide and stayed between 12.5 and 12.8 pH range.

EXAMPLE II

The effect of various metal oxides and hydroxides with various resinous systems was further studied. Thus, the oxides and hydroxides of calcium, barium and magnesium were used at two levels, i.e., 1 and 6 parts per 100 dry parts of CF coating and with all presently available zincated resins, i.e., Zn-PPP, Zn-PTB, Zn-POP I, and Zn-PNP. The parts of the resin per 100 dry parts of CF coating were maintained at 7.4 as in the earlier experiments.

The above-mentioned resins were ground separately in an attritor at 50% solids. The resin grind formula used is reported in the following Table IX.

TABLE IX

Fifty Percent Resin Grind Formula (grinding time = 35 minutes)

| | Dry (gms) | Wet (gms) |
|---|---|---|
| *Resin | 150.0 | 150.0 |
| Water | — | 130.5 |
| Tamol 731 at 25% | 4.5 | 18.0 |
| DiAmmonium Phosphate | 1.5 | 1.5 |
| TOTALS | 156.0 | 300.0 |

*Resin used: Zn-PPP, Zn-PTB, Zn-POP I, and Zn-PNP (zinc-modified para-nonylphenol formaldehyde)

These resin grinds were then used in a CF coating composition as shown in Tables X and XI, the coating formulation of Table X containing 1 dry part of calcium oxide or calcium hydroxide per 100 dry parts of CF coating and the coating formulation of Table XI containing 6 dry parts of CaO or CaOH per 100 dry parts of CF coating. Control CF coatings were also made to check the comparative improvement achieved by the addition of the oxide or hydroxide. Thus, control coatings were made in each resin series by substituting for the amount of oxide or hydroxide with clay. The CF coatings were also checked for coating pH. Laboratory drawdowns were made with 5.0-pound weight of coat. In making the laboratory drawdowns, the wet coating slurry is cast using a wire-wound rod designed to lay down about a 16-pound per ream (3,300 square feet) wet film coating. The coating is hot air dried and the coat weight is determined by weighing the coated sheet and an uncoated sample of coating base. If the dry coat weight is 5 pounds per ream (3,300 square feet), the sample is used. If the dry coat weight differs significantly from 5 pounds per ream, additional coatings are made with different wire-round rods designed to apply more or less coating as is appropriate.

TABLE X

CF Coating Formula (32% solids)

| Materials | Dry (gms) | Wet (gms) |
|---|---|---|
| Water | — | 30.0 |
| *Oxide or Hydroxide Used | 1.0 | 1.0 |
| +Resin Grind Used at 50% | 7.4 | 14.8 |
| Clay Slurry at 68% | 73.1 | 107.5 |
| Calcium Carbonate | 6.0 | 6.0 |
| Water | — | 60.0 |
| Starch P.G. 230 at 12% | 6.5 | 54.2 |
| Water | — | 26.5 |
| Latex Dow 620 at 50% | 6.0 | 12.0 |

TABLE X-continued

CF Coating Formula (32% solids)

| Materials | Dry (gms) | Wet (gms) |
|---|---|---|
| TOTALS | 100.0 | 312.0 |

*Oxide or Hydroxide Used: Magnesium oxide, barium oxide, magnesium hydroxide, barium hydroxide, control, calcium oxide, and calcium hydroxide.
+Resin Used: Zn-PPP, and Zn-PTB, Zn-POP I, and Zn-PNP.

TABLE XI

CF Coating Formula (32% solids)

| Materials | Dry (gms) | Wet (gms) |
|---|---|---|
| Water | — | 30.0 |
| *Oxide or Hydroxide Used | 6.0 | 6.0 |
| +Resin Grind Used at 50% | 7.4 | 14.8 |
| Clay Slurry at 68% | 68.1 | 100.2 |
| Calcium Carbonate | 6.0 | 6.0 |
| Water | — | 60.0 |
| Starch P.G. 230 at 12% | 6.5 | 54.2 |
| Water | — | 28.8 |
| Latex Dow 620 at 50% | 6.0 | 12.0 |
| TOTALS | 100.0 | 312.0 |

*Oxide or Hydroxide Used: Magnesium oxide, barium oxide, magnesium hydroxide, barium hydroxide, control, calcium oxide, and calcium hydroxide
+Resin Used: Zn-PPP, Zn-PTB, Zn-POP I, and Zn-PNP.

The results of the formulations set forth in Tables X and XI are tabulated in Table XII.

TABLE XII

| Resin Used | Hydroxides or Oxides Used | Amount Oxide or Hydroxide Used* | Coating pH | Typewriter Intensity (20 min) | Typewriter Intensity (48 hrs) | Fade T.I. Δ |
|---|---|---|---|---|---|---|
| Zn-PPP | Control | 1 | 8.3 | 37 | 35 | 15 |
| | BaO | 1 | 10.0 | 47 | 43 | 16 |
| | $Mg(OH)_2$ | 1 | 9.0 | 36 | 35 | 17 |
| | $Ba(OH)_2$ | 1 | 9.7 | 41 | 36 | 18 |
| | MgO | 1 | 10.5 | 36 | 35 | 13 |
| | CaO | 1 | 11.7 | 51 | 41 | 21 |
| | $Ca(OH)_2$ | 1 | 11.0 | 49 | 44 | 21 |
| Zn-PPP | Control | 6 | 8.2 | 37 | 34 | 18 |
| | BaO | 6 | 13.1 | 54 | 42 | 39 |
| | $Mg(OH)_2$ | 6 | 9.3 | 36 | 34 | 17 |
| | $Ba(OH)_2$ | 6 | 12.0 | 55 | 46 | 23 |
| | MgO | 6 | 10.9 | 35 | 36 | 15 |
| | CaO | 6 | 12.7 | 56 | 37 | 31 |
| | $Ca(OH)_2$ | 6 | 12.7 | 58 | 38 | 29 |
| Zn-PTB | Control | 1 | 8.2 | 39 | 41 | 17 |
| | BaO | 1 | 10.0 | 39 | 40 | 14 |
| | $Mg(OH)_2$ | 1 | 9.0 | 36 | 38 | 19 |
| | $Ba(OH)_2$ | 1 | 9.3 | 38 | 39 | 13 |
| | MgO | 1 | 10.6 | 32 | 33 | 18 |
| | CaO | 1 | 11.7 | 33 | 39 | 20 |
| | $Ca(OH)_2$ | 1 | 11.2 | 33 | 38 | 15 |
| Zn-PTB | Control | 6 | 8.45 | 41 | 44 | 26 |
| | BaO | 6 | 13.2 | 44 | 42 | 40 |
| | $Mg(OH)_2$ | 6 | 9.2 | 37 | 40 | 22 |
| | $Ba(OH)_2$ | 6 | 12.1 | 38 | 43 | 29 |
| | MgO | 6 | 10.45 | 33 | 34 | 21 |
| | CaO | 6 | 12.6 | 43 | 39 | 37 |
| | $Ca(OH)_2$ | 6 | 12.6 | 43 | 40 | 39 |
| Zn-POP | Control | 1 | 8.5 | 37 | 42 | 20 |
| | BaO | 1 | 12.1 | 36 | 35 | 15 |
| | $Mg(OH)_2$ | 1 | 9.0 | 36 | 42 | 22 |
| | $Ba(OH)_2$ | 1 | 10.4 | 38 | 40 | 15 |
| | MgO | 1 | 10.9 | 33 | 34 | 14 |
| | CaO | 1 | 12.5 | 33 | 33 | 11 |
| | $Ca(OH)_2$ | 1 | 12.5 | 33 | 33 | 12 |
| Zn-POP | Control | 6 | 8.5 | 36 | 40 | 20 |
| | BaO | 6 | 12.9 | 49 | 48 | 37 |
| | $Mg(OH)_2$ | 6 | 9.4 | 34 | 38 | 21 |
| | $Ba(OH)_2$ | 6 | 12.4 | 34 | 32 | 10 |
| | MgO | 6 | 11.7 | 31 | 32 | 16 |
| | CaO | 6 | 12.6 | 25 | 25 | 13 |
| | $Ca(OH)_2$ | 6 | 12.4 | 25 | 24 | 16 |
| Zn-PNP | Control | 1 | 7.8 | 43 | 49 | 23 |

TABLE XII-continued

| Resin Used | Hydroxides or Oxides Used | Amount Oxide or Hydroxide Used* | Coating pH | Typewriter Intensity (20 min) | Typewriter Intensity (48 hrs) | Fade T.I. Δ |
|---|---|---|---|---|---|---|
| | MgO | 1 | 11.0 | 34 | 35 | 13 |
| | BaO | 1 | 11.6 | 38 | 38 | 18 |
| | $Mg(OH)_2$ | 1 | 9.0 | 39 | 41 | 19 |
| | $Ba(OH)_2$ | 1 | 9.5 | 40 | 41 | 20 |
| | CaO | 1 | 12.6 | 32 | 31 | 13 |
| | $Ca(OH)_2$ | 1 | 12.4 | 36 | 34 | 15 |
| Zn-PNP | Control | 6 | 8.2 | 41 | 42 | 20 |
| | MgO | 6 | 11.7 | 31 | 32 | 17 |
| | BaO | 6 | 13.2 | 32 | 31 | 20 |
| | $Mg(OH)_2$ | 6 | 9.4 | 36 | 39 | 19 |
| | $Ba(OH)_2$ | 6 | 12.9 | 33 | 31 | 16 |
| | CaO | 6 | 12.8 | 26 | 26 | 17 |
| | $Ca(OH)_2$ | 6 | 12.8 | 26 | 26 | 16 |

*percent based on dry weight

By rearranging the typewriter intensity values of Table XII into the format of Table XIII, the effect of the oxide or hydroxide on each resin can be better visualized.

The tabulations shown in Table XIII show that calcium oxide and calcium hydroxide gave the best typewriter intensity values with Zn-POP resins.

The coating base used was 34-pound bond base. The following coating formulations were used:

| Materials | Percent | Dry Parts | Range |
|---|---|---|---|
| Zn-POP I | 54 | 12.1 | 3.5 |
| Kaolin Clay Slurry | 68 | 67.9 | 68.0 |
| Calcium Carbonate | 100 | 6.0 | 6.0 |
| Calcium Oxide | 100 | 1.5 | 10.0 |
| Cooked Starch Binder | 12 | 6.5 | 6.5 |
| Styrene Butadiene Latex | 50 | 6.0 | 6.0 |
| Water | — | — | — |
| TOTALS | | 100.0 | 100.0 |

Typewriter intensity was checked and the results showed that CF with calcium oxide gave bright and deep blue print compared to that with no calcium oxide. With proper ratio of calcium oxide to resin, the fade resistance of the print was better compared to that with no calcium oxide. The test results are shown in Table XIV below.

TABLE XIV

| | A | B | C | D | E |
|---|---|---|---|---|---|
| Resin Dry Parts (100 coating dry parts) | 13.6 | 10.6 | 7.4 | 3.5 | 0 |
| Calcium Oxide Dry Parts (100 coating dry parts) | 0 | 3.0 | 6.0 | 10.0 | 12.0 |
| Intensity | | | | | |
| (20 minutes) | 38 | 30 | 27 | 33 | 67 |
| (48 hours) | 38 | 28 | 28 | 32 | 67 |
| Fade | | | | | |
| (24 hours; exposure T.I. Δ) | 9 | 7 | 10 | 19 | 18 |
| (72 hours; | | | | | |

TABLE XIII

Comparison - 1 and 6 percent

| Resin Used | Hydroxide or Oxide Used | Amount Oxide or Hydroxide Used* | Typewriter Intensity (20 min) | Typewriter Intensity (48 hrs) | Resin Used | Hydroxide or Oxide Used | Amount Oxide or Hydroxide Used* | Typewriter Intensity (20 min) | Typewriter Intensity (48 hrs) |
|---|---|---|---|---|---|---|---|---|---|
| Zn-PPP | MgO | 1 | 36 | 35 | Zn-PPP | $Ba(OH)_2$ | 1 | 41 | 36 |
| Zn-PTB | | | 32 | 33 | Zn-PTB | | | 38 | 39 |
| Zn-POP | | | 33 | 34 | Zn-POP | | | 38 | 40 |
| Zn-PNP | | | 34 | 35 | Zn-PNP | | | 40 | 41 |
| Zn-PPP | MgO | 6 | 35 | 36 | Zn-PPP | $Ba(OH)_2$ | 6 | 55 | 46 |
| Zn-PTB | | | 33 | 34 | Zn-PTB | | | 38 | 43 |
| Zn-POP | | | 31 | 32 | Zn-POP | | | 34 | 32 |
| Zn-PNP | | | 31 | 32 | Zn-PNP | | | 33 | 31 |
| Zn-PPP | BaO | 1 | 47 | 43 | Zn-PPP | CaO | 1 | 51 | 41 |
| Zn-PTB | | | 32 | 33 | Zn-PTB | | | 33 | 39 |
| Zn-POP | | | 36 | 35 | Zn-POP | | | 33 | 33 |
| Zn-PNP | | | 38 | 38 | Zn-PNP | | | 32 | 31 |
| Zn-PPP | BaO | 6 | 54 | 42 | Zn-PPP | CaO | 6 | 56 | 37 |
| Zn-PTB | | | 39 | 40 | Zn-PTB | | | 43 | 39 |
| Zn-POP | | | 49 | 48 | Zn-POP | | | 25 | 25 |
| Zn-PNP | | | 32 | 31 | Zn-PNP | | | 26 | 26 |
| Zn-PPP | $Mg(OH)_2$ | 1 | 36 | 35 | Zn-PPP | $Ca(OH)_2$ | 1 | 49 | 44 |
| Zn-PTB | | | 36 | 38 | Zn-PTB | | | 33 | 38 |
| Zn-POP | | | 36 | 42 | Zn-POP | | | 33 | 33 |
| Zn-PNP | | | 39 | 41 | Zn-PNP | | | 32 | 31 |
| Zn-PPP | $Mg(OH)_2$ | 6 | 36 | 34 | Zn-PPP | $Ca(OH)_2$ | 6 | 58 | 38 |
| Zn-PTB | | | 37 | 40 | Zn-PTB | | | 43 | 40 |
| Zn-POP | | | 34 | 38 | Zn-POP | | | 25 | 24 |
| Zn-PNP | | | 36 | 39 | Zn-PNP | | | 26 | 26 |
| Zn-PPP | Control | 1 | 37 | 35 | | | | | |
| Zn-PTB | | | 39 | 41 | | | | | |
| Zn-POP | | | 37 | 42 | | | | | |
| Zn-PNP | | | 43 | 49 | | | | | |
| Zn-PPP | Control | 6 | 37 | 34 | | | | | |
| Zn-PTB | | | 41 | 44 | | | | | |
| Zn-POP | | | 36 | 40 | | | | | |
| Zn-PNP | | | 41 | 42 | | | | | |

*Percent by dry weight

EXAMPLE III

Calcium oxide was incorporated into the coating by dispersing into water and mixing with resin grind and surfactants. The other ingredients, i.e., clay, starch, etc., were added to this mixture and coating was adjusted to proper solids (approximately 30%) for smooth coating.

TABLE XIV-continued

| | A | B | C | D | E |
|---|---|---|---|---|---|
| exposure T.I. Δ) | 26 | 17 | 22 | 38 | 22 |

In the above tables tests were performed to determine typewriter intensity and UV fade resistance. These tests were conducted as follows:

In the version of the test used to produce the data in the present application, a CB sheet and a CF sheet are placed in coated face to coated face relationship followed by two backing sheets. When pressure is applied by impact of the typewriter mechanism, capsules of the CB sheet rupture and capsule-contained materials are transferred to and reacted with the acid component(s) of the CF sheet to yield a color in the pattern of the impact device. The image forms on the second copy in a set of four plies. The pattern on the impact mechanism is cross-hatched. Multiple impacts and multiple lines of impact result in a visually continuous cross-hatch image in both vertical and horizontal directions.

The typewriter intensity (T.I.) of this image is determined by measuring the reflectance of the imaged area, measuring the reflectance of the background area and calculating the percentage from the following ratio:

$$T.I. = \frac{\text{Printed Character Reflectance}}{\text{Background Reflectance}} \times 100$$

A high value indicates little color development and a low value indicates good color development.

Fade Resistance Test

The test device is constructed as follows: a bank of 18 daylight fluorescent lamps (21 inches long, 13 nominal lamp watts) vertically mounted on 1-inch centers is placed 1½ inches from the sample to be exposed. For the actual test, a typewriter intensity is determined as above for a typewriter image 48 hours after imaging. This imaged sample is placed in the above daylight fluorescent device for 24 hours and the intensity redetermined by reflectance measurement and the T. I. calculated as before. The T.I. Δ is the differerence between the unexposed (48-hour) T.I. and the T.I. after 24 hours in the test device.

The applicant is aware of the following patents related to a color-developing sheet for pressure-sensitive paper:

British Spec. No. 1,317,543;
British Spec. No. 1,330,984;
U.S. Pat. No. 3,516,845, Brockett, June 23, 1970;
U.S. Pat. No. 3,723,156, Brockett et al, Mar. 27, 1973;
U.S Pat. No. 3,732,120, Brockett et al, May 8, 1973;
U.S. Pat. No. 3,737,410, Mueller, June 5, 1973;
U.S. Pat. No. 3,856,553, Hayashi, et al, Dec. 24, 1974.

None of the above references suggest the advantageous results achieved in color response by the combined use of the particular alkaline earth metal oxide or hydroxide with the zinc-modified alkylphenol-formaldehyde resins defined by the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A color-developer composition for use in pressure-sensitive recording sheets which comprises a zinc-modified para-alkylphenol formaldehyde resin in which the alkyl moiety is selected from the group consisting of octyl and nonyl and about 0.5 to 6 parts by dry weight per 100 parts by dry weight of the composition of a metallic compound selected from the group consisting of calcium oxide, calcium hydroxide, and magnesium oxide, said resin and metallic compound combining to produce a color response when contacted with a color-producing material.

2. The color-developer composition of claim 1 which further comprises kaolin clay.

3. The color-developer composition of claim 1, wherein the metallic compound is present in the composition in an amount of about 1 to 4 parts by dry weight per 100 parts by dry weight of the composition.

4. The color-developer composition of claim 1, further comprising at least one binder.

5. The color-developer composition of claim 4, wherein the binder comprises cooked starch and styrene-butadiene latex.

6. A pressure-sensitive record sheet material comprising a supporting web material having adhesively bound on the surface thereof a coating composition comprising a zinc-modified para-alkylphenol formaldehyde resin in which the alkyl moiety is selected from the group consisting of octyl and nonyl and about 0.5 to 6 parts by dry weight per 100 parts by dry weight of the composition of a metallic compound selected from the group consisting of calcium oxide, calcium hydroxide, and magnesium oxide, said resin and metallic compound combining to produce a color response when contacted with a color-producing material.

7. The pressure-sensitive record sheet material of claim 6 which further comprises kaolin clay.

8. The pressure-sensitive record sheet material of claim 6, wherein the metallic compound is present in the composition in an amount of about 1 to 4 parts by dry weight per 100 parts by weight of the composition.

9. The pressure-sensitive record sheet material of claim 6, wherein the supporting web material is paper.

10. The pressure-sensitive record sheet material of claim 6, further containing at least one binder.

11. The pressure-sensitive record sheet material of claim 10, wherein the binder comprises cooked starch and styrene-butadiene latex.

12. A pressure-sensitive record sheet material comprising a supporting web material having bound on the surface thereof a coating composition comprising kaolin clay, zinc-modified para-octylphenol formaldehyde resin and about 0.5 to 6 parts by dry weight per 100 parts by dry weight of the composition of a metallic compound selected from the group consisting of calcium oxide and calcium hydroxide, said resin and metallic compound combining to produce a color response when contacted with a color-producing material.

* * * * *